(12) United States Patent
Andersen et al.

(10) Patent No.: US 12,270,422 B2
(45) Date of Patent: Apr. 8, 2025

(54) PRESSURE EXCHANGER

(71) Applicant: Danfoss A/S, Nordborg (DK)

(72) Inventors: Stig Kildegaard Andersen, Krusaa (DK); Poul Erik Hansen, Aabenraa (DK); Georg Herborg Enevoldsen, Nordborg (DK); Kevin Evald, Nordborg (DK)

(73) Assignee: DANFOSS A/S, Nordborg (DK)

( * ) Notice: Subject to any disclaimer, the term of this patent is extended or adjusted under 35 U.S.C. 154(b) by 128 days.

(21) Appl. No.: 17/878,991

(22) Filed: Aug. 2, 2022

(65) Prior Publication Data

US 2023/0043692 A1    Feb. 9, 2023

(30) Foreign Application Priority Data

Aug. 4, 2021 (EP) .................................... 21189639

(51) Int. Cl.
*F04F 13/00* (2009.01)
(52) U.S. Cl.
CPC ................... *F04F 13/00* (2013.01)
(58) Field of Classification Search
CPC .... F04F 13/00; F04B 1/10; F04B 1/20; F04B 1/0408; F04B 1/124
USPC .................... 417/225, 226; 91/488
See application file for complete search history.

(56) References Cited

U.S. PATENT DOCUMENTS

| 6,318,242 | B1 * | 11/2001 | Stoppek .................. F04B 53/14 |
| | | | 92/187 |
| 6,540,487 | B2 | 4/2003 | Polizos et al. |
| 7,306,437 | B2 | 12/2007 | Hauge |
| 10,933,375 | B1 | 3/2021 | Oklejas, Jr. et al. |
| 2004/0182658 | A1 | 9/2004 | Dimsey |
| 2023/0020630 | A1 * | 1/2023 | Samudrala .............. F04F 13/00 |

FOREIGN PATENT DOCUMENTS

| EP | 1508361 A1 * | 2/2005 | ............. B01D 61/06 |
| EP | 1 948 942 B1 | 4/2009 | |
| EP | 2 078 867 A1 | 7/2009 | |
| EP | 3 020 968 A1 | 5/2016 | |
| GB | 1 390 290 A | 4/1975 | |

OTHER PUBLICATIONS

Hearing Notice for Indian Patent Application No. 202214015717, dated Jan. 15, 2024.
First Examination Report for Indian Patent Application No. 202214015717, dated Feb. 17, 2023.

* cited by examiner

*Primary Examiner* — Kenneth J Hansen
(74) *Attorney, Agent, or Firm* — McCormick, Paulding & Huber PLLC

(57) ABSTRACT

A pressure exchanger with a valve system includes a cylinder barrel (1), two valve plates (2) and two port plates (3, 4), wherein the cylinder barrel (1) has at least one cylinder (7) which accommodates a piston (8). The objective is to provide a pressure exchanger with low wear and a low maintenance effort. This objective is solved by a pressure exchanger including a piston (8) braking system and that the piston (8) includes a pressure relief arrangement.

12 Claims, 2 Drawing Sheets

PRESSURE EXCHANGER

CROSS-REFERENCE TO RELATED APPLICATION

This application claims foreign priority benefits under U.S.C. § 119 from European Patent Application No. 21189639.4, filed Aug. 4, 2021, the content of which is hereby incorporated by reference in its entirety.

TECHNICAL FIELD

The invention relates to a pressure exchanger with a valve system comprising a cylinder barrel, two valve plates and two port plates, wherein the cylinder barrel comprises at least one cylinder which accommodates a piston.

BACKGROUND

The cylinder is arranged in a longitudinal direction of the cylinder barrel, such that a fluidic connection is realized between two longitudinal faces of the cylinder barrel. On each face of the cylinder barrel a first side of a valve plate is arranged, while a port plate is arranged on a second side of each valve plate. The cylinder barrel rotates relatively to the port plates.

One port plate is a first port plate, while the other port plate is a second port plate. Each of the first and second port plates comprise two openings. Pressure is applied to the first opening of the first port plate, such that the piston in at least one cylinder is moved from a first end position close to the first port plate to a second end position close to the second port plate. Thus, fluid in the cylinder is pressed out through a first opening of the second port plate.

The cylinder barrel rotates, such that the cylinder interacts with a second opening of the first port plate and a second opening of the second port plate. Since the second opening of the second port plate applies fluidic pressure to the cylinder, the piston is pushed from the second end position to the first end position, pushing the fluid in the cylinder through the second opening of the first port plate.

The cylinder barrel rotates further, until the cylinder interacts with the first opening of the first port plate and with the first opening of the second port plate. The process starts all over again.

Depending on the pressure ratios and the rotational speed of the cylinder barrel, the piston might hit the vale plates each time it is transferred from one end position to the other, resulting in wear and downtime due to maintenance. Further, an abrupt stop of the piston results in a loss of energy, since its kinetic energy is supposed to displace fluid, resulting in a low energy efficiency.

SUMMARY

The problem underlying the present invention is to provide a pressure exchanger with little wear and a good energy efficiency.

This problem is solved by the features of claim 1.

The pressure exchanger comprises a piston braking system and the piston comprises a pressure relief arrangement. The piston braking system allows to decrease the pistons velocity close to one of the end positions in case the pistons velocity exceeds the limitations and risks hitting the valve plate causing damage. This, however, results in an increase in pressure, even a pressure peak, within the cylinder, such that the piston or the cylinder barrel might take damage. In order to compensate the pressure peak, the piston is provided with a pressure relief arrangement. This arrangement allows a reduction of the excess pressure, such that harm of the pressure exchanger is prevented.

A main task of a pressure exchanger is to exchange pressures between two fluids, one having a high pressure level and the other one having a low pressure level, wherein the fluids can differ from each other. The pressure exchanger transfers pressure energy from the high pressure fluid to the low pressure fluid. The pressure exchanger is used for example in a process operating at an elevated pressure level and having a high pressure waste stream, such that the high pressure level of the waste stream is transferred to an input stream for the elevated pressure level. Such a pressure exchanger is used for example in a reverse osmosis system, wherein the pressure exchanger can be placed in the connection leaving the output side of the reverse osmosis membrane where the pressure level is relatively high, such that some of this pressure can be utilized for the input stream to the reverse osmosis membrane.

Alternatively, to a pressure exchanger, a pump or motor can be used.

The piston is formed for example from a lightweight material, such as plastics or alike. The lightweight material allows a soft impact in the end positions, reducing wear.

In one embodiment, the piston is arranged floating in the cylinder. The floating piston allows a predefined fluid connection between each side of the cylinder divided by the piston. Further, the floating arrangement allows a lubrication of the piston, such that wear of the piston and cylinder are low resulting in a low maintenance effort.

In one embodiment, the piston braking system comprises at least one thrust pad forming a chamber between the cylinder barrel and the valve plate. Preferably the thrust pad is fixed in the valve plate and a hydraulic, flexible seal is provided to seal the thrust pad and the cylinder in the cylinder barrel with a flexible seal. Each of the at least one cylinder is provided with one thrust pad. This allows a soft impact of the piston, while the chamber provides a lubrication to the piston.

The thrust pad can be formed for example from super duplex steel or alike. Further, the thrust pad can be for example coated with some kind of wear resistant material, like for example DLC, PEE, etc. that interacts well with the material of the piston. Alternatively, the material of the thrust pad can be adjusted to the material of the piston or the other way around, such that the interaction of the piston and the thrust pad result in low wear and thus in a low maintenance effort.

In one embodiment the thrust pads protrude partially radially inward with respect to an inner surface of the cylinder. Thus, the piston can be decelerated by hitting the thrust pad with a side facing in the direction of movement. This allows a stopping of the piston at a predetermined position.

In one embodiment the piston comprises at least a conical part. The conical part is arranged at one end of the piston in a direction of movement. The conical part interacts with the thrust pad and a formed chamber, such that a fluid pad is formed within the chamber. This fluid pad is pressurized while the piston reaches its end position, decelerating the piston. Furthermore, the conical parts force fluid around the piston resulting in a good lubrication between the piston and the cylinder. Moreover, the conical parts allow an easy assembly of the piston into the cylinder, since they are self centering.

In one embodiment, in an end position of the piston with the cylinder, the chamber is at least partly closed by the conical part. Preferably, the thrust pad and the valve plate are sealed with a press fit, and the thrust pad and the cylinders are sealed with O-rings. So, the fluid in the chamber can escape only through a gap created between the thrust pad, the cylinder barrel and the piston. Depending on the increase of pressure in the chamber, the deceleration is determined. This results in a good stopping action of the piston.

In one embodiment, a center part of the piston is formed cylindrically having two sides facing in a longitudinal direction of the cylinder, wherein the pressure relief arrangement comprises at least temporarily a fluidic connection between the two sides of the piston. This arrangement allows excess pressure of one side of the piston being released to the other side of the piston. As a result, a peak pressure is reduced quickly without harming any component of the pressure exchanger.

In one embodiment, the pressure relief arrangement comprises at least a cavity arranged in an interior of the piston, wherein the cavity is fluidly connected to both sides of the piston. The cavity by itself is a buffer, which catches fluid from the overpressure side reducing a mixing of the fluids from both sides of the piston.

In a pressure exchanger functioning without a piston, the two fluids have physical contact, such that the two fluids mix. Due to pressure relief system of the piston, a mixing of the fluids is low, increasing the efficiency of the pressure exchanger.

In one embodiment, the at least one cavity is filled with a spongy material. The cavity comprising a spongy material is a buffer as well. The spongy material describes any material capable of absorbing fluids, preferably porous materials. for example, ceramics. The exchange of the fluids is small, since the spongy material absorbs the fluids slowly.

In one embodiment, the pressure relief arrangement comprises at least one relief channel. The at least one relief channel is a simple and cost effective measure to release excess pressure from a high pressure side to a low pressure side of the piston.

In one embodiment, the pressure relief arrangement comprises at least a valve. The valve can be for example an overpressure valve, wherein the set pressure can be chosen in accordance to the pressure ratios and other characteristics of the pressure exchanger.

In one embodiment, the pressure relief arrangement comprises at least one pressure relief channel, at least one valve, at least one cavity and at least one cavity filled with a spongy material or a combination of said. This allows a good adjustment of the pressure relief arrangement, such that a pressure loss is small.

In one embodiment, the conical parts are annular projections protrude from a center part of the piston. This allows an adaptation of the interior design of the piston. Any dimension of the relief channel, the valve, and/or the cavity can be adjusted, without altering the outer dimensions of the piston. Thus, the piston can be adapted easily to any desired configuration.

Furthermore, the annular projections result in a weight reduction, such that the efficiency of the pressure exchanger is good.

BRIEF DESCRIPTION OF THE DRAWINGS

The invention will now be described in more detail with reference to the drawing, wherein.

DETAILED DESCRIPTION

Figure 1:
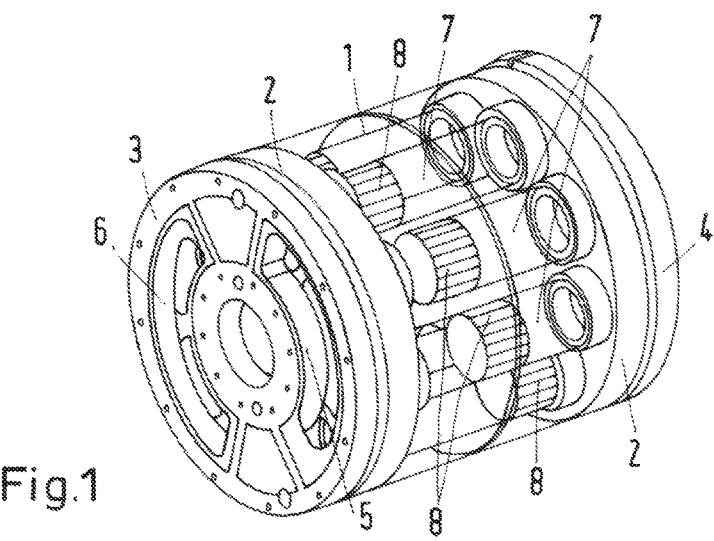
FIG. 1 shows inner components of a pressure exchanger.

FIG. 1 depicts a cylinder barrel 1, valve plates 2, a first port plate 3 and a second port plate 4. The valve plates 2 are sandwiched between the cylinder barrel 1 and either the first port plate 3 or the second port plate 4. The cylinder barrel 1 and the valve plates 2 are arranged rotatably relative to the first port plate 3 and the second port plate 4.

The first port plate 3 comprises a first opening 5 and a second opening 6. The second port plate 4 comprises also a first opening and a second opening, which are both not depicted.

The cylinder barrel 1 comprises several cylinders 7 accommodating each a movable and floating piston 8. The piston 8 comprises a first side facing in the direction of the first port plate 3 and a second face facing in the direction of the second port plate 4. The piston 8 can move according to pressure differences between the first opening 5 of the first port plate 3 and the first opening of the second port plate 4 from a first end position close to the first port plate 3 to a second end position close to the second port plate 4.

As the cylinder barrel 1 is rotated, starting from the first end position the piston 8 a first pressurized fluid is applied through the first opening 5 of the first port plate 3 to the first side of the piston 8, such that the piston 8 is moved to the second end position. As a result, a second fluid in the cylinder 7 on the second side of the piston 8 is transferred through the first opening of the second port plate 4.

As the piston 8 reaches the second end position, the cylinder 7 interacts with the second opening 6 of the first port plate 3 and with the second opening of the second port plate 4. The second fluid is transferred into the cylinder 7 interacting with the second side of the piston 8 and moving the piston 8 from the second end position to the first end position, such that the first fluid in the cylinder 7 is transferred through the second opening 6 of the first port plate 3.

This allows to transfer pressure from a first fluid to a second fluid.

In case the piston 8 comes quickly or abruptly to a stop, an applied pressure could deform or damage the piston 8 if the pressure peak is too high or not released in a predefined period of time. In order to avoid damaging the piston 8, the piston 8 comprises a pressure relief arrangement, which allows a reduction of a peak pressure or excess pressure from the first side of the piston 8 to the second side of the piston 8 or the other way around.

A piston 8 comprising a pressure relief arrangement is depicted in the FIG. 2 to FIG. 5. The pressure relief arrangement allows at least temporarily a fluid communication between both sides of the piston 8. Excess pressure can be discharged from a high pressure side to a low pressure side of the piston 8.

Figure 2:
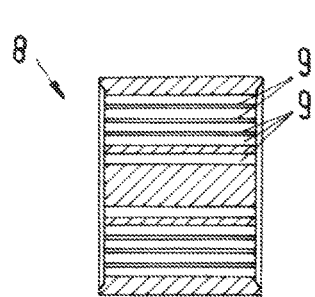
FIG. 2 shows a first embodiment of a piston.

In FIG. 2, the piston 8 comprises multiple relief channels 9 allowing a fluid communication between both sides of the piston 8. Depending on a pressure ratio between the both sides of the piston 8, viscosities of the first fluid and the second fluid, maximum peak pressure and/or other characteristics of the pressure exchanger, the relief channels 9 can be designed. For example, the number of the relief channels 9, their diameter and/or length can be adjusted.

Figure 3:
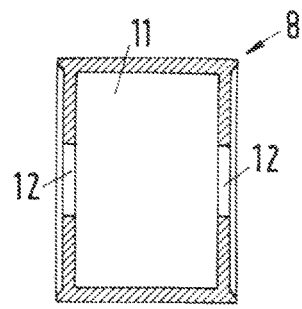
FIG. 3 shows a second embodiment of a piston.

FIG. 3 depicts a piston 8 having a valve 10 allowing temporarily a fluid connection between both sides of the piston. The valve 10 can be for example an overpressure valve or alike. The valve 10 opens as soon as a predefined set value is exceeded, such that damage of the piston 8 is avoided.

Figure 4:
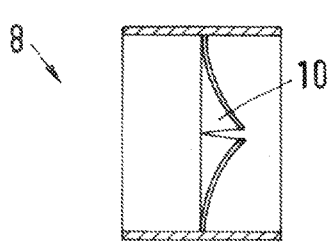
FIG. 4 shows a third embodiment of a piston.

FIG. 4 depicts a piston 8 having a cavity 11 and a fluid communication 12 on each side of the piston 8 allowing a fluid communication of the cavity 11 with fluid on either side of the piston 8. The cavity 11 is basically a buffer in which the first fluid and second fluid might mix. Due to its buffer function, just a small amount of the mixture of the first fluid and the second fluid is brought into the fluids outside the piston 8.

Figure 5:
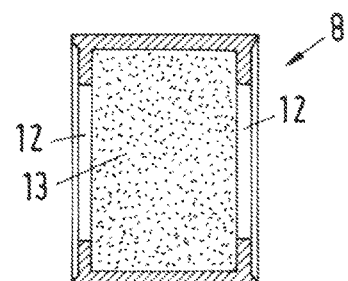
FIG. 5 shows a fourth embodiment of a piston.

In FIG. 5 the cavity 11 is filled with a spongy material 13 allowing a fluid communication with either side of the piston 8 via fluid communications 12. The spongy material slows down a mixing between the two fluids, such that a mixing with the fluids in the cylinder 7 is low. The spongy material 13 can consist of porous materials for example like ceramics.

Figure 6:
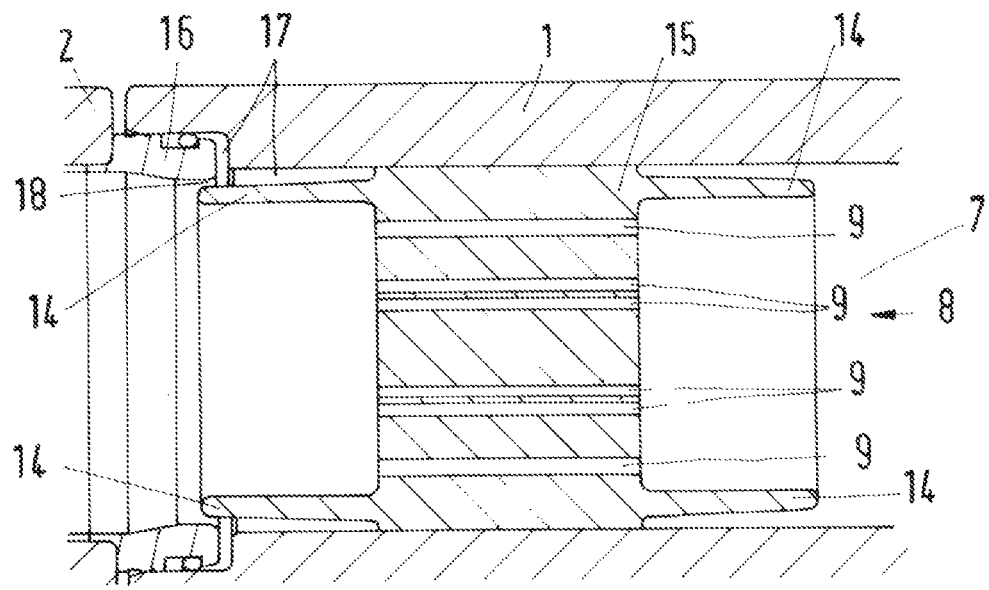
FIG. 6 shows a piston braking system, wherein the piston is close to its end position.
Figure 7:
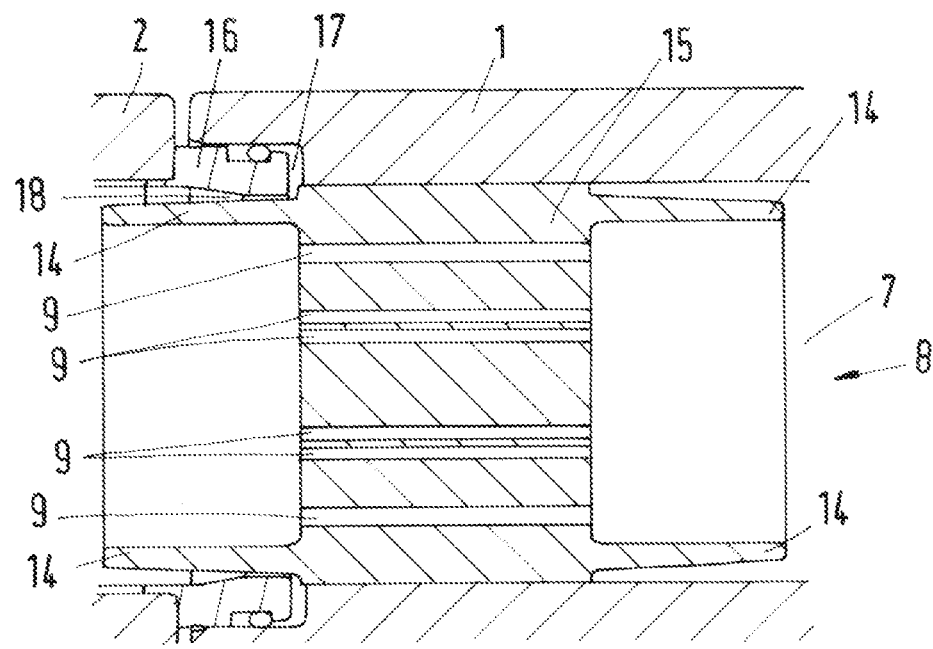
FIG. 7 shows a piston braking system, wherein the piston is in its end position.

FIGS. 6 and 7 show a pressure exchanger having a piston braking system and a pressure relief arrangement. The piston 8 comprises in a cylinder 7 having multiple relief channels 9 forming the pressure relief arrangement. Furthermore, conical parts 14 are arranged on both sides of the piston 8. The conical part 14 are formed annularly protruding in a longitudinal direction from a center part 15 of the piston 8.

With regard to the piston braking system, a thrust pad 16 is provided between the cylinder barrel 1 and each valve plate 2. The thrust pad 16 protrudes partially radially inward with respect to an inner surface of the cylinder 8. Thus, the conical parts 14 of the piston 8 interact with the thrust pad 16 as soon as the piston 8 comes close to either of its end positions. Between the inner surface of the cylinder 8, the thrust pad 16 and the conical part 14 a chamber 17 is created. The fluid provided in the chamber 17 can escape through a gap between the thrust pad 16, the piston 8, the cylinder barrel 1 and/or the valve plate 2.

The deceleration is determined by a pressure increase in the chamber 17. As the piston 8 comes closer to the end position, the volume of the chamber 17 is decreased, while the gap is decreased as well. Thus, the fluid of the chamber 17 needs to escape through the narrowing gap 18, which requires an increasing pressure. This allows a soft stopping of the movement of the piston 8. The pressure increase can be adjusted to fit the requirements by adjusting an angle, a length and/or the diameter of the conical part 14.

Alternatively, to the piston 8 comprising pressure relief channels 9, the pressure relief arrangement depicted in FIGS. 7 and 8 can comprise at least one of embodiments of FIGS. 3 to 5.

Another alternative is that the pressure relief arrangement is a combination of the embodiments depicted in FIGS. 2 to 5.

The combination of the piston braking system and the pressure relief arrangement allows a moderate stopping of the piston 8, while excess pressure is relieved. Thus, a load of the piston 8, the cylinder barrel 1 and the valve plate 2 is reduces resulting in less wear and thus in a good maintenance and efficiency.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A pressure exchanger with a valve system comprising a cylinder barrel, two valve plates and two port plates, wherein the cylinder barrel comprises at least one cylinder which accommodates a piston, wherein the pressure exchanger comprises a piston braking system and that the piston comprises a pressure relief arrangement, wherein the piston comprises two sides facing in a longitudinal direction of the cylinder, and wherein the pressure relief arrangement comprises at least temporarily a fluidic connection between the two sides of the piston.

2. The pressure exchanger according to claim 1, wherein the piston is arranged floating in the cylinder.

3. The pressure exchanger according to claim 1, wherein the piston braking system comprises at least one thrust pad forming a chamber between the cylinder barrel and the valve plates.

4. The pressure exchanger according to claim 3, wherein the at least one thrust pad protrudes partially radially inward with respect to an inner surface of the cylinder.

5. The pressure exchanger according to claim 3, wherein the piston comprises at least a conical part.

6. The pressure exchanger according to claim 5, wherein the chamber is at least partly closed by the conical part when the piston is in an end position of the cylinder.

7. The pressure exchanger according to claim 6, wherein the at least one conical part is an annular projection from a center part of the piston.

8. The pressure exchanger according to claim 1, wherein the pressure relief arrangement comprises at least a cavity arranged in an interior of the piston, wherein the cavity is fluidly connected to both sides of the piston.

9. The pressure exchanger according to claim 1, wherein the pressure relief arrangement comprises at least a cavity filled with a spongy material, wherein the cavity is fluidly connected to both sides of the piston.

10. The pressure exchanger according to claim 1, wherein the pressure relief arrangement comprises at least one relief channel.

11. The pressure exchanger according to claim 1, wherein the pressure relief arrangement comprises at least a valve.

12. A pressure exchanger with a valve system comprising a cylinder barrel, two valve plates and two port plates, wherein the cylinder barrel comprises at least one cylinder which accommodates a piston, wherein the pressure exchanger comprises a piston braking system and that the piston comprises a pressure relief arrangement, wherein the piston comprises two sides facing in a longitudinal direction of the cylinder, and wherein the pressure relief arrangement is configured to reduce excess pressure on one of the two sides of the piston through a fluidic connection between the two sides of the piston.

* * * * *